United States Patent
Jeong

(10) Patent No.: US 7,744,147 B2
(45) Date of Patent: Jun. 29, 2010

(54) DEFLECTOR FOR RESPONDING VEHICLE SPEED

(75) Inventor: In Joo Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 12/246,292

(22) Filed: Oct. 6, 2008

(65) Prior Publication Data

US 2009/0152895 A1 Jun. 18, 2009

(30) Foreign Application Priority Data

Dec. 15, 2007 (KR) .................. 10-2007-0131770

(51) Int. Cl.
*B60J 9/00* (2006.01)
(52) U.S. Cl. .................................. 296/180.5
(58) Field of Classification Search .............. 296/180.5, 296/180.3, 146.1, 180.1, 91, 217; 49/360
See application file for complete search history.

(56) References Cited

U.S. PATENT DOCUMENTS 4,674,788 A * 6/1987 Ohmura et al. .......... 296/180.5
4,810,022 A * 3/1989 Takagi et al. ............. 296/180.5
5,052,745 A * 10/1991 Preiss ........................ 296/217
6,431,639 B2 * 8/2002 Yoon ...................... 296/180.1
6,926,346 B1 * 8/2005 Wong et al. ............. 296/180.5
7,621,588 B2 * 11/2009 Zhu et al. ................ 296/180.1

FOREIGN PATENT DOCUMENTS

| KR | 10-0145570 B1 | 5/1998 |
| KR | 10-0377148 B1 | 3/2003 |
| KR | 10-0534401 B1 | 12/2005 |

* cited by examiner

*Primary Examiner*—Kiran B. Patel
(74) *Attorney, Agent, or Firm*—Morgan, Lewis & Bockius LLP

(57) ABSTRACT

The present invention relates to a deflector for responding a vehicle speed including a deflector body installed at a door frame to rotate diagonally toward the rear of the vehicle, wherein one end of the deflector body in the front of the vehicle is connected via a hinge and the other end thereof in the rear of the vehicle is configured in a form of a free end; a solenoid connected to the deflector body and pushing up or down the deflector body; a piezoelectric element installed in a division channel and sensing the intensity of wind being in contact with the same; and an ECU adjusting a projection height of the deflector body in multiple levels by applying control current corresponding to three levels to the solenoid on the basis of the vehicle speed, a status of a rear door glass, and a sensing signal of the piezoelectric element.

10 Claims, 1 Drawing Sheet

DEFLECTOR FOR RESPONDING VEHICLE SPEED

CROSS-REFERENCE TO RELATED APPLICATIONS

The present application is based on, and claims priority from, Korean Application Serial Number 10-2007-0131770, filed on Dec. 15, 2007, the disclosure of which is hereby incorporated by reference herein in its entirety.

FIELD OF THE INVENTION

The present invention relates to a deflector installed in a vehicle, and more particularly, to a deflector for responding a vehicle speed which is installed in a door frame and varies in inclination angle according to the vehicle speed and the intensity of wind, thereby effectively reducing a drone noise of a rear door glass.

BACKGROUND OF THE INVENTION

In the related art, when one door glass in a back seat is completely or partially opened at the time of driving a vehicle, a part of an air flow climbing over a center pillar is in contact with a rear pillar or a division channel, thereby generating a drone noise of a rear door glass. The drone noise gives a passenger a severe unpleasant feeling to trigger a headache by pressing a passenger's ear rather than a noise to be harsh to the car.

In order to reduce the above-mentioned drone noise of the rear door glass, there was proposed a method of preventing the air flow from being in direct contact with the rear pillar or the division channel by allowing the air flow to be raised upwards by a deflector at the time of driving the vehicle by fixedly installing the deflector in a rear door frame to be inclined upward to the rear of the vehicle at a predetermined angle, in prior art. However, in this method, there was a disadvantage in that the deflector is installed in the rear door frame to protrude to the outside of the vehicle, thereby degrading an exterior of the vehicle and a wind noise is rather generated by the deflector at the time of driving a vehicle at a high speed with the rear door glass closed.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a deflector for a responding vehicle speed capable of improving an exterior by being received in the inside of a door frame in case that a rear door glass is not opened or a speed of the vehicle is so low that a drone noise is not generated and improving the ride comfort of the vehicle by effectively reduce the drone noise according to the speed of the vehicle by preventing the air flow from being in contact with a division channel or a rear pillar by being inclined and protruding in a proper height according to the speed of the vehicle in case that the vehicle is driven at a predetermined speed or more and thus the drone noise is generated.

According to an exemplary embodiment of the present invention, a deflector for responding the vehicle speed may include a deflector body that is received in a receiving groove formed in the inside of a door frame and is installed to rotate pivotally toward the rear of the vehicle, wherein one end of the deflector body in the front of the vehicle is coupled via a hinge and the other end of the deflector body in the rear of the vehicle is configured in a form of a free end; a solenoid that is pivotally coupled substantially to the other end of the deflector body and pushes up or down the deflector body; a piezoelectric element that is installed in a division channel and senses the intensity of wind being in contact with the division channel; and an electronic control unit that adjusts a projection height of the deflector body in multiple level by applying control current corresponding to three levels to the solenoid on the basis of the vehicle speed, a status of whether or not a rear door glass is opened, and a sensing signal of the piezoelectric element.

The electronic control unit may not apply any control current to the solenoid in case that the electronic control unit concludes that the rear door glass is not opened.

The electronic control unit may sense the vehicle speed by means of the vehicle speed sensor in case that the electronic control unit concludes that the rear door glass is opened by means of the door glass sensor, and does not apply any control current to the solenoid in case that the vehicle speed is about 30 km/h or less or about 100 km/h or more.

The electronic control unit may sense the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and does not apply any control current to the solenoid in case that the sensing signal of the intensity of the wind has a predetermined value or less. The electronic control unit may sense the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h and adjusts a projection height of the deflector in three levels by applying control current corresponding to different three-level amplitudes to the solenoid depending on an amplitude of the sensing signal in case that the sensing signal of the intensity of the wind has more than the predetermined value.

In another exemplary embodiment of the present invention, a deflector for responding the vehicle speed may include a deflector body that is received in a receiving groove formed in the inside of a door frame and is installed to rotate pivotally toward the rear of the vehicle, wherein one end of the deflector body in the front of the vehicle is coupled via a hinge and the other end of the deflector body in the rear of the vehicle is configured in a form of a free end; a solenoid that is pivotally coupled substantially to the other end of the deflector body and pushes up or down the deflector body; a piezoelectric element that is installed in a division channel and senses the intensity of wind being in contact with the division channel; and an electronic control unit that adjusts a projection height of the deflector body in at least a level by applying control current to the solenoid on the basis of the vehicle speed, a status of whether or not a rear door glass is opened, and a sensing signal of the piezoelectric element.

The electronic control unit may not apply any control current to the solenoid in case that the electronic control unit concludes that the rear door glass is not opened.

The electronic control unit may sense the vehicle speed by means of the vehicle speed sensor in case that the electronic control unit concludes that the rear door glass is opened by means of the door glass sensor, and does not apply any control current to the solenoid in case that the vehicle speed is about 30 km/h or less or about 100 km/h or more.

The electronic control unit may sense the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and does not apply any control current to the solenoid in case that the sensing signal of the intensity of the wind has a predetermined value or less. The electronic control unit may sense the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and adjusts a projection height of the deflector in at least a level by applying control current corresponding to different amplitudes to the solenoid depending on an amplitude of the sensing signal in case that the sensing signal of the intensity of the wind has more than the predetermined value.

BRIEF DESCRIPTION OF THE DRAWINGS

For a better understanding of the nature and objects of the present invention, reference should be made to the following detailed description with the accompanying drawings, in which.

Figure 1:
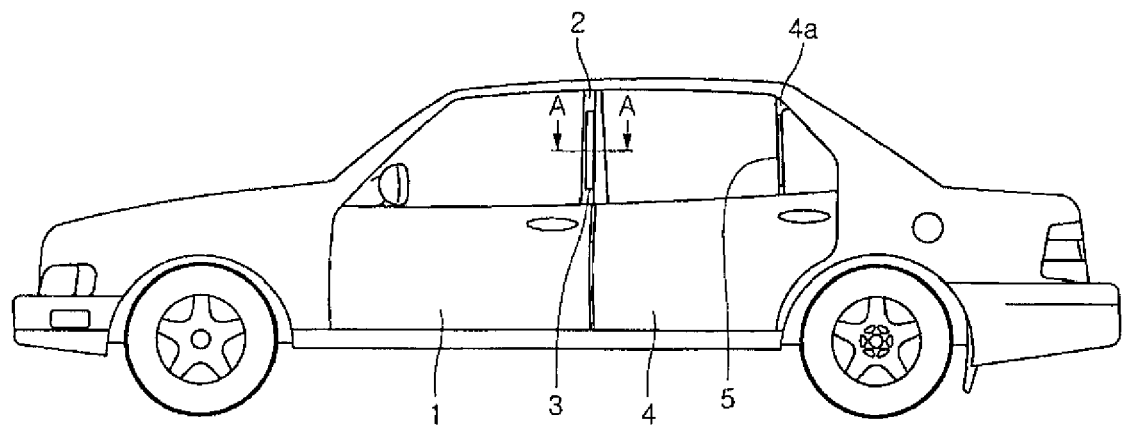
FIG. 1 is a side view illustrating a state where a deflector according to an embodiment of the present invention is installed in a door frame.

In the figures, reference numbers refer to the same or equivalent parts of the present invention throughout the several figures of the drawing.

DETAILED DESCRIPTION OF THE DRAWINGS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An installation configuration of a deflector for responding a vehicle speed according to an embodiment of the present invention is shown in FIG. 1. A rectangular deflector 3 is received and rotatably installed in a door frame 2 of a front door 1, and a piezoelectric element 5 for sensing the intensity of wind is installed in a division channel 4a installed in a rear door 4.

Deflector 3 may be installed in the door frame of the rear door.

Figure 2:
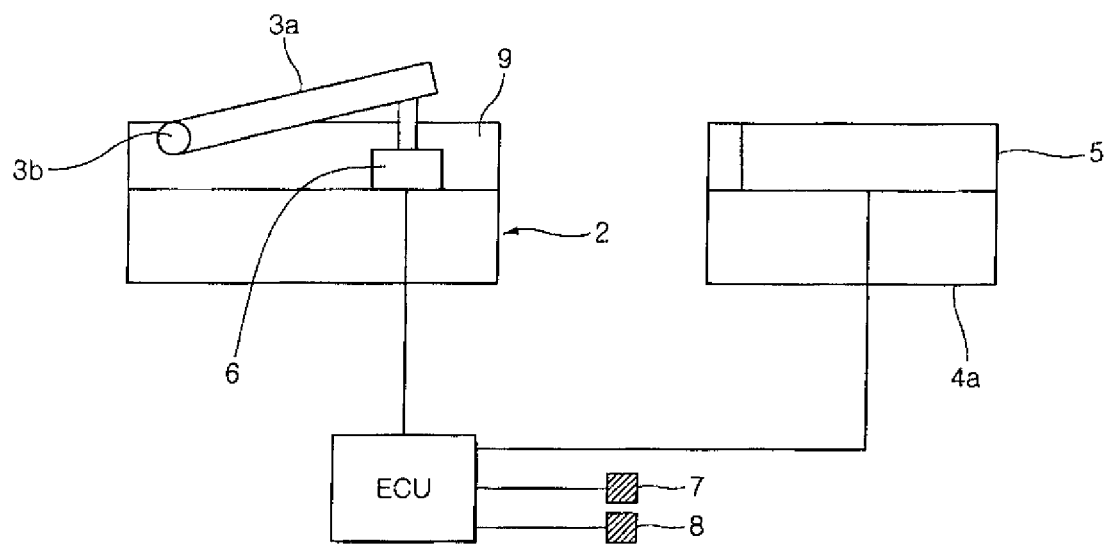
FIG. 2 is a cross-sectional view taken along a line A-A shown in FIG. 1.

As shown in FIG. 2, a dented receiving groove 9 is formed in door frame 2, and a deflector body 3a is received in the receiving groove 9. Further, one side of deflector body 3a facing the front of a vehicle is rotatably mounted in the inside of the receiving groove around a hinge 3b, and the other side of the deflector body facing the rear of the vehicle is configured in a form of a free end. Accordingly, the deflector body 3a is diagonally rotatable clockwise or counterclockwise around the hinge 3b.

A plunger of a solenoid 6 is pivotally coupled to a bottom surface of the deflector body 3a inside the door frame 2. When the plunger of the solenoid 6 protrudes upward, the deflector body 3a rotates counterclockwise around the hinge 3b in the drawing and is inclined upward to the rear of the vehicle.

Solenoid 6 is electrically connected to an output terminal of an ECU (Electronic Control Unit) and operates depending on control current applied from the ECU so as to control the movement of solenoid 6. At this time, in an exemplary embodiment of the present invention, a protrusion height of the plunger of the solenoid 6 is changed in three levels according to the amplitude of the control current.

Piezoelectric element 5 for sensing the intensity of the wind and inputting a sensing signal corresponding to the intensity of the wind, a vehicle speed sensor 7 for sensing the vehicle speed and inputting the sensing signal, and a door glass sensor 8 for sensing the opening of a rear door glass and inputting the sensing signal are connected to an input terminal of the ECU.

Hence, first, the ECU determines whether or not the door glass of the rear door is opened by means of door glass sensor 8. Since the electronic control unit does not apply any control current to the solenoid regardless of the vehicle speed and the sensing signal of the piezoelectric element in case that the door glass is not opened, the deflector maintains a state received in the inside of the door frame. Therefore, there is no fear that the deflector unnecessarily protrudes to damage an exterior of the vehicle.

Meanwhile, when the electronic control unit concludes that the rear door glass is opened on the basis of the sensing signal inputted from the door glass sensor 8, the electronic control unit determines a current vehicle speed by means of the vehicle speed sensor 7. If the vehicle speed is 30 km/h or less or 100 km/h or more, the electronic control unit does not apply any control current to the solenoid. Accordingly, the deflector maintains the state received in the inside of the door frame.

That is, since a drone noise is not generated when the vehicle speed is 30 km/h or less with the door glass opened, the deflector does not need to be projected. Further, since a wind noise is rather generated by the deflector when the deflector is projected in case that the vehicle speed is 100 km/h or more, thereby deteriorating the ride comfort of the vehicle. For this reason, the deflector does not need to be projected.

Meanwhile, the electronic control unit senses the intensity of the wind which comes in contact with the division channel by means of the piezoelectric element when the vehicle speed is in the range of 30 to 100 km/h with the door glass of the vehicle opened.

Subsequently, since the intensity of the wind is weak and thus the drone noise is not generated even though the vehicle speed is in the range of 30 to 100 km/h in case that the sensing signal of the piezoelectric element has a predetermined value or less, the deflector maintains the state received in the inside of the door frame.

The electronic control unit applies control current having different amplitudes to the solenoid depending on the intensity of the wind sensed by means of the piezoelectric element in case that the sensing signal of the piezoelectric element has more than the predetermined value. For instance, in case that the intensity of the wind is weak, the deflector is projected in a lowest height by applying a control current of a first level to optimally reduce the drone noise.

Next, in case that the intensity of the wind becomes gradually stronger, the drone noise is optimally reduced according to the intensity of the wind and the vehicle speed by applying a control current of a second level or a third level to the solenoid to adjust the projection height of the deflector in a first level to a third level, thereby improving the ride comfort of the vehicle.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A deflector for responding a vehicle speed, the deflector comprising:
    a deflector body that is received in a receiving groove formed in the inside of a door frame and is installed to rotate pivotally toward the rear of the vehicle, wherein one end of the deflector body in the front of the vehicle is coupled via a hinge and the other end of the deflector body in the rear of the vehicle is configured in a form of a free end;
    a solenoid that is pivotally coupled substantially to the other end of the deflector body and pushes up or down the deflector body;
    a piezoelectric element that is installed in a division channel and senses the intensity of wind being in contact with the division channel; and
    an electronic control unit that adjusts a projection height of the deflector body in multiple level by applying control current corresponding to three levels to the solenoid on the basis of the vehicle speed, a status of whether or not a rear door glass is opened, and a sensing signal of the piezoelectric element.

2. The deflector as defined in claim 1, wherein the electronic control unit does not apply any control current to the solenoid in case that the electronic control unit concludes that the rear door glass is not opened.

3. The deflector as defined in claim 1, wherein the electronic control unit senses the vehicle speed by means of the vehicle speed sensor in case that the electronic control unit concludes that the rear door glass is opened by means of the door glass sensor, and does not apply any control current to the solenoid in case that the vehicle speed is about 30 km/h or less or about 100 km/h or more.

4. The deflector as defined in claim 1, wherein the electronic control unit senses the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and does not apply any control current to the solenoid in case that the sensing signal of the intensity of the wind has a predetermined value or less.

5. The deflector as defined in claim 4, wherein the electronic control unit senses the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h and adjusts a projection height of the deflector in three levels by applying control current corresponding to different three-level amplitudes to the solenoid depending on an amplitude of the sensing signal in case that the sensing signal of the intensity of the wind has more than the predetermined value.

6. A deflector for responding a vehicle speed, the deflector comprising:
    a deflector body that is received in a receiving groove formed in the inside of a door frame and is installed to rotate pivotally toward the rear of the vehicle, wherein one end of the deflector body in the front of the vehicle is coupled via a hinge and the other end of the deflector body in the rear of the vehicle is configured in a form of a free end;
    a solenoid that is pivotally coupled substantially to the other end of the deflector body and pushes up or down the deflector body;
    a piezoelectric element that is installed in a division channel and senses the intensity of wind being in contact with the division channel; and
    an electronic control unit that adjusts a projection height of the deflector body in at least a level by applying control current to the solenoid on the basis of the vehicle speed, a status of whether or not a rear door glass is opened, and a sensing signal of the piezoelectric element.

7. The deflector as defined in claim 6, wherein the electronic control unit does not apply any control current to the solenoid in case that the electronic control unit concludes that the rear door glass is not opened.

8. The deflector as defined in claim 6, wherein the electronic control unit senses the vehicle speed by means of the vehicle speed sensor in case that the electronic control unit concludes that the rear door glass is opened by means of the door glass sensor, and does not apply any control current to the solenoid in case that the vehicle speed is about 30 km/h or less or about 100 km/h or more.

9. The deflector as defined in claim 6, wherein the electronic control unit senses the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and does not apply any control current to the solenoid in case that the sensing signal of the intensity of the wind has a predetermined value or less.

10. The deflector as defined in claim 9, wherein the electronic control unit senses the vehicle speed by means of the vehicle speed sensor in case that the electronic control unit concludes that the rear door glass is opened by means of the door glass sensor, senses the intensity of the wind being in contact with the division channel by means of the piezoelectric element in case that the vehicle speed is in the range of about 30 to about 100 km/h, and adjusts a projection height of the deflector in at least a level by applying control current corresponding to different amplitudes to the solenoid depending on an amplitude of the sensing signal in case that the sensing signal of the intensity of the wind has more than the predetermined value.

* * * * *